July 25, 1950     H. R. THORESEN     2,516,273
UTENSIL RECEPTACLE

Filed Aug. 21, 1946     2 Sheets-Sheet 1

INVENTOR.
HALFDAN R. THORESEN,
BY Victor J. Evans & Co.
ATTORNEYS

July 25, 1950  H. R. THORESEN  2,516,273
UTENSIL RECEPTACLE
Filed Aug. 21, 1946  2 Sheets-Sheet 2
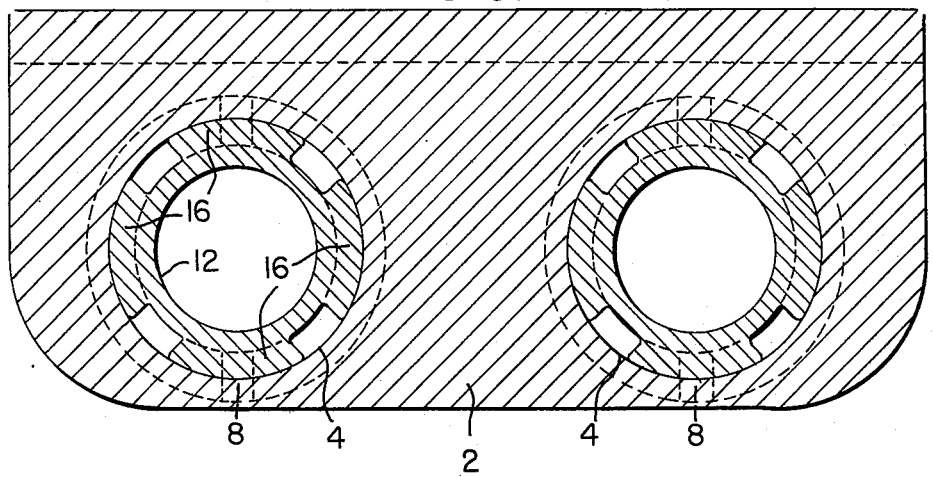
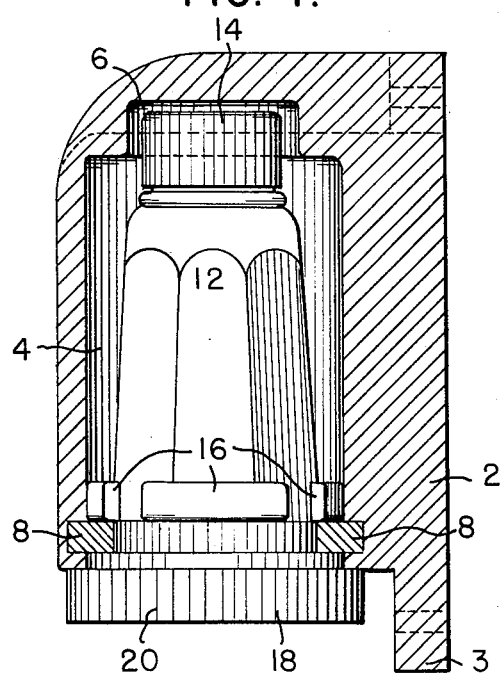
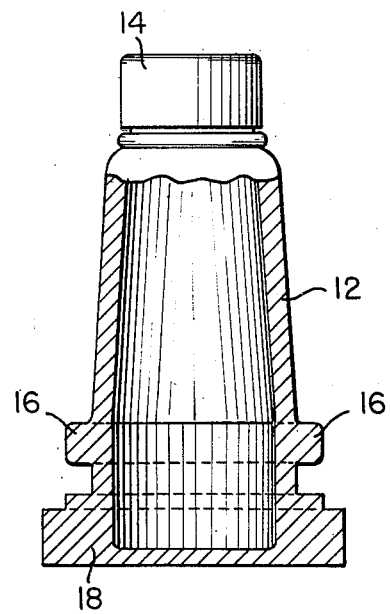
INVENTOR.
HALFDAN R. THORESEN,
BY *Victor J. Evans & Co.*
ATTORNEYS Patented July 25, 1950

2,516,273

UNITED STATES PATENT OFFICE 2,516,273

UTENSIL RECEPTACLE

Halfdan Ring Thoresen, Brooklyn, N. Y.

Application August 21, 1946, Serial No. 692,071

1 Claim. (Cl. 312—112)

My present invention relates to an improved receptacle and more particularly to a receptacle of the type adapted to receive and retain therein such containers as those conventionally used for condiments as salt and pepper, and the receptacle generally comprises a body formed with receiving openings therein into which the condiment holder may be inserted, and means are provided for quickly and easily attaching and detaching the holder from the receptacle.

In the accompanying drawings I have illustrated one complete example of the physical embodiment of my invention according to the best mode I have thus far devised but it will be understood that various changes and alterations may be made in the exemplified structure within the scope of the appended claim.

In the drawings:

Figure 3 is a horizontal sectional view.

Figure 4 is a transverse vertical sectional view; and

Figure 5 is a partial section view of a holder for condiments adapted for use with the receptacle.

Figure 1:
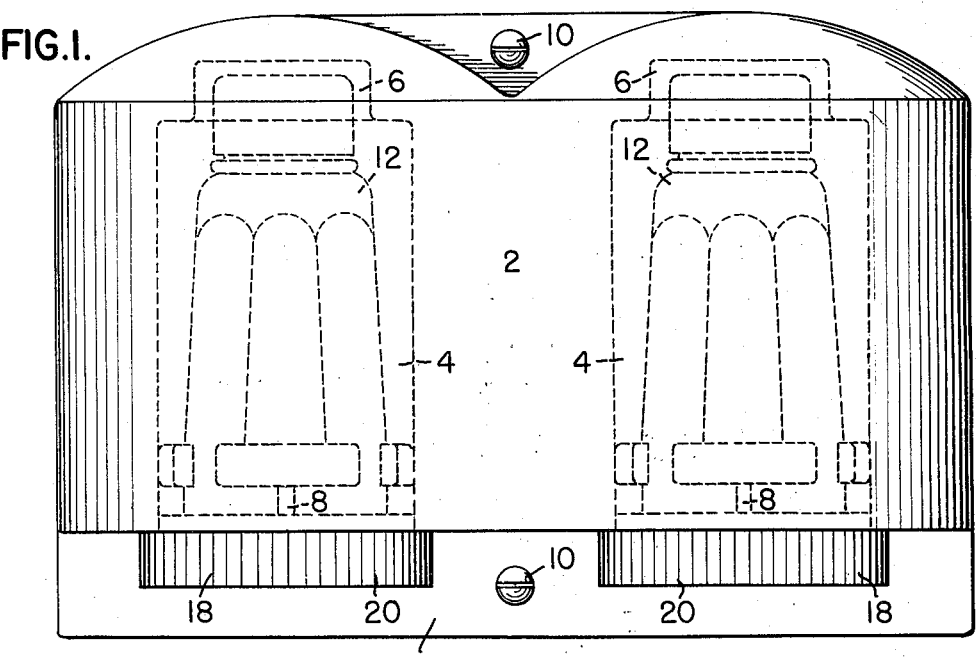
Figure 1 is a front elevational view of the receptacle of my invention.
Figure 2:
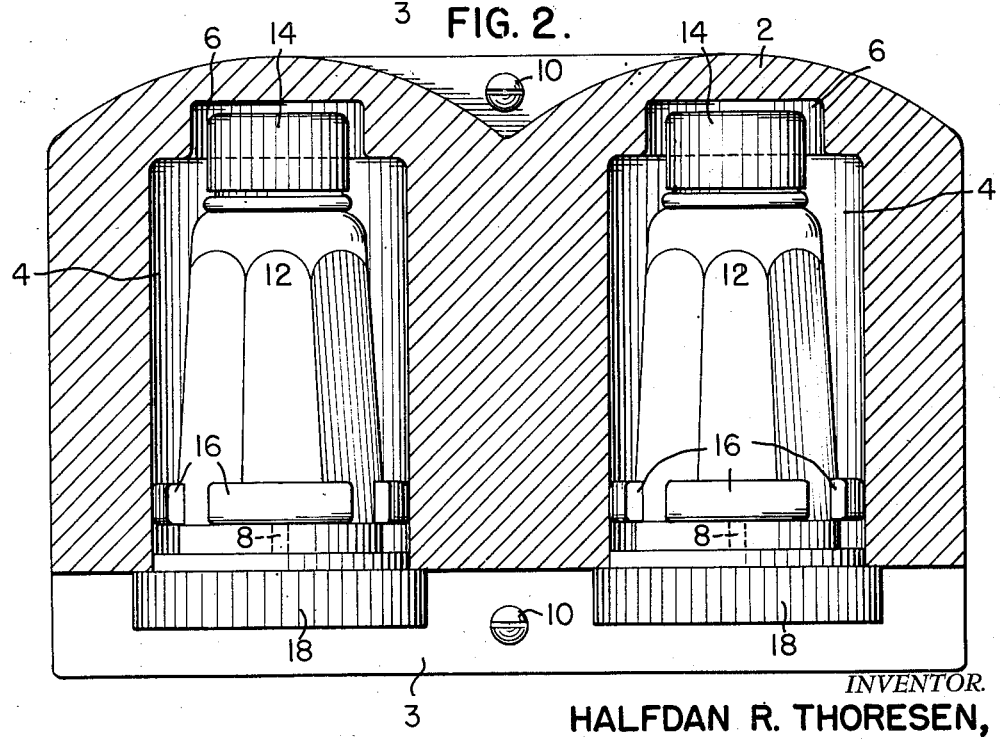
Figure 2 is a vertical longitudinal sectional view thereof.

Referring now to the drawings wherein like characters indicate like parts I have illustrated the present embodiment of my invention as comprising the receptacle having a body 2 solid and of suitable material as plastic or wood, formed with a lower depending flange 3, there being screws 10 extending through the flange 3 for securing the body to a vertical support, such as a wall.

The body is provided with spaced cylindrical bores 4 therein each having upper counterbores 6. Extending from the wall of the bore I employ a pair of spaced diametrically opposed lugs or projections 8, and the body of the receptacle is designed for attachment to the wall of the kitchen or other appropriate place by means of screws 10.

The condiment container 12 is hollow to provide space for such matter as salt, pepper or other material, and is formed with a removable cap 14.

The lower outer wall of the container 12 is fashioned with spaced ribs 16, here shown as four, but it will be apparent that more or less may well be employed.

The containers of which there may be used one, two, or more are each formed with a base 18, preferably fluted as at 20.

When the container has been used and is ready for storage in the closed receptacle to be kept free from dust, dirt, and to a large extent, moisture, the container is grasped in the fingers about the fluted base and the container is inserted into one of the cylindrical bores of the receptacle 2 so that the lugs 8 of the receptacle will pass between the spaced ribs of the container. The container is then given a partial turn within the bore and the lugs will engage the ribs to secure the container in the receptacle until needed. To remove the container, the operation is reversed.

From the above description of the construction and operation of the device of my invention it will be apparent that the use thereof will maintain the condiment containers in position for easy access when needed and will also in the closed receptacle keep the container free from dust, dirt, and moisture.

Having thus fully described my invention what I claim as new and desire to secure by Letters Patent is:

The combination with a receptacle body, a flange dependingly carried by said body and adapted to be secured to a vertical support, said body being provided with a pair of spaced bores and a counterbore spaced above each of said bores, and a plurality of diametrically opposed lugs extending from the wall surrounding each of said bores, of a container arranged within each of said bores adapted to hold condiments, a cap releasably secured to each of said containers and positioned within said counterbore, a plurality of spaced ribs on each of said containers coacting with said lugs to support the containers in said receptacle body, and a fluted base on each of the containers extending below the complemental bore whereby each of the containers may be rotated to free the ribs from the lugs.

HALFDAN RING THORESEN.

REFERENCES CITED

The following references are of record in the file of this patent:

UNITED STATES PATENTS

| Number | Name | Date |
|---|---|---|
| 22,962 | Martin | Feb. 15, 1859 |
| 183,890 | Block | Oct. 31, 1876 |
| 238,711 | Peterson | Mar. 8, 1881 |
| 1,303,884 | Goodnow | May 20, 1919 |
| 1,458,848 | Ploplis | June 12, 1923 |
| 2,182,017 | Donaghy | Dec. 5, 1939 |
| 2,186,600 | Behrens | Jan. 9, 1940 |
| 2,396,932 | Slaton | Mar. 19, 1946 |